United States Patent

Mazelsky

[15] 3,647,999
[45] Mar. 7, 1972

[54] DECELERATION-RESPONSIVE SENSORS

[72] Inventor: Bernard Mazelsky, West Covina, Calif.
[73] Assignee: Ara, Inc., West Covina, Calif.
[22] Filed: July 23, 1970
[21] Appl. No.: 57,525

[52] U.S. Cl. .................................. 200/61.45 R, 200/61.49
[51] Int. Cl. ....................................................... H01h 35/14
[58] Field of Search ........................... 200/61.45–61.53, 200/166 H, 166 M; 340/261, 262; 280/150 B, 150 AB

[56] References Cited

UNITED STATES PATENTS

| | | | |
|---|---|---|---|
| 3,001,039 | 9/1961 | Johnson | 200/61.45 |
| 2,991,339 | 7/1961 | Williams et al. | 200/61.46 |
| 2,850,291 | 9/1958 | Ziccardi | 200/61.51 X |
| 3,054,096 | 9/1962 | Peritz | 340/261 |
| 3,014,104 | 12/1961 | Cobine et al. | 337/90 |
| 3,552,768 | 1/1971 | Kaiser | 280/150 |

FOREIGN PATENTS OR APPLICATIONS

| | | | |
|---|---|---|---|
| 1,494,985 | 8/1967 | France | 200/61.48 |

Primary Examiner—Robert K. Schaefer
Assistant Examiner—M. Ginsburg
Attorney—Herzig & Walsh

[57] ABSTRACT

The invention is a deceleration-responsive sensor particularly adaptable for use with vehicle safety devices of the type comprising an inflatable air bag which inflates at the moment of impact to protect passengers. The sensor comprises a movable inertia mass responsive to deceleration forces acting over a wide range of direction. The inertia mass is biased to an initial position to avoid undesired continued small motion activation. The inertia mass and its mounting is constructed to have a natural frequency such that an activating deceleration force of predetermined magnitude and duration is required for the device to respond and trigger the safety mechanism.

14 Claims, 14 Drawing Figures

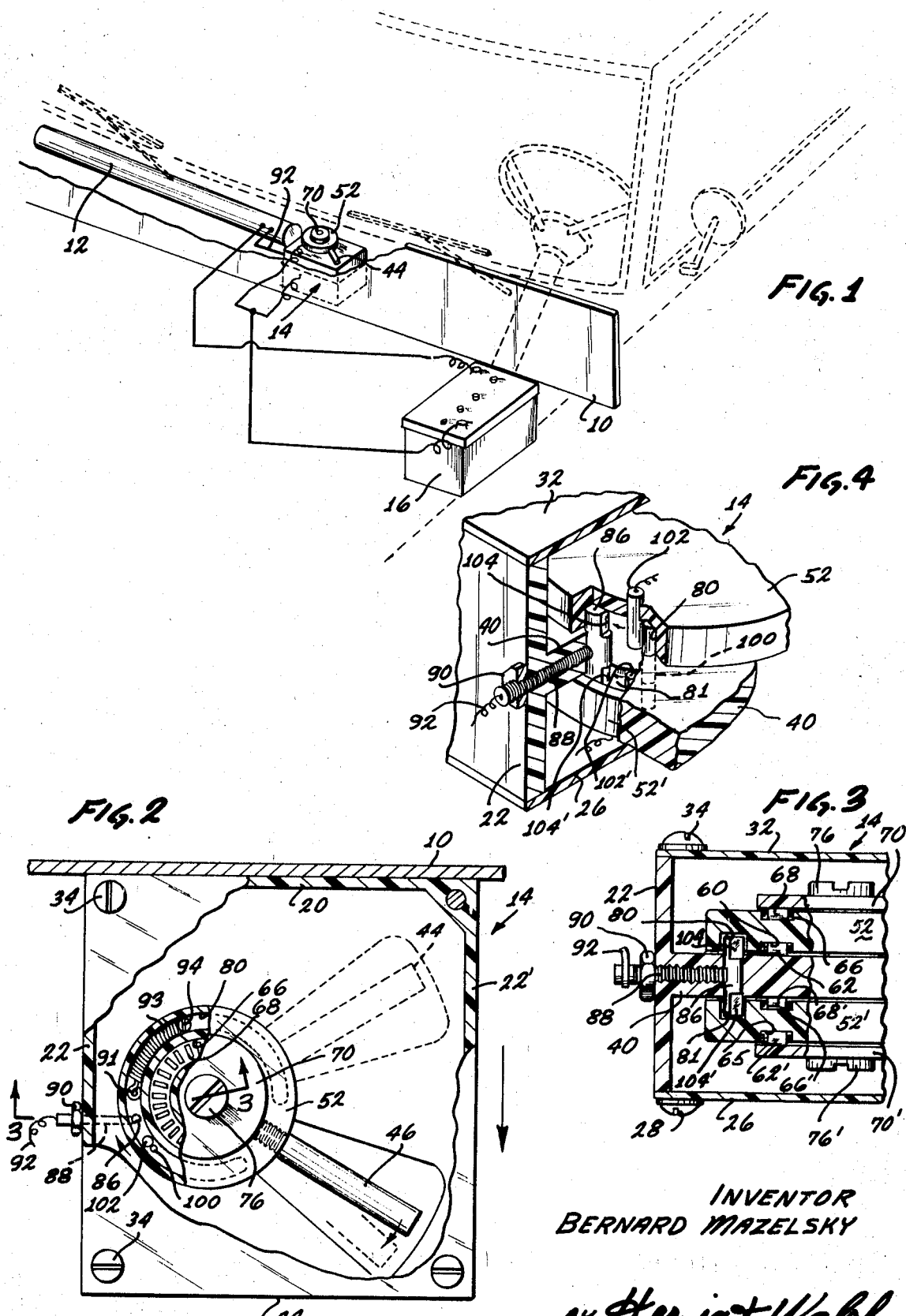

Patented March 7, 1972
3,647,999
3 Sheets-Sheet 2
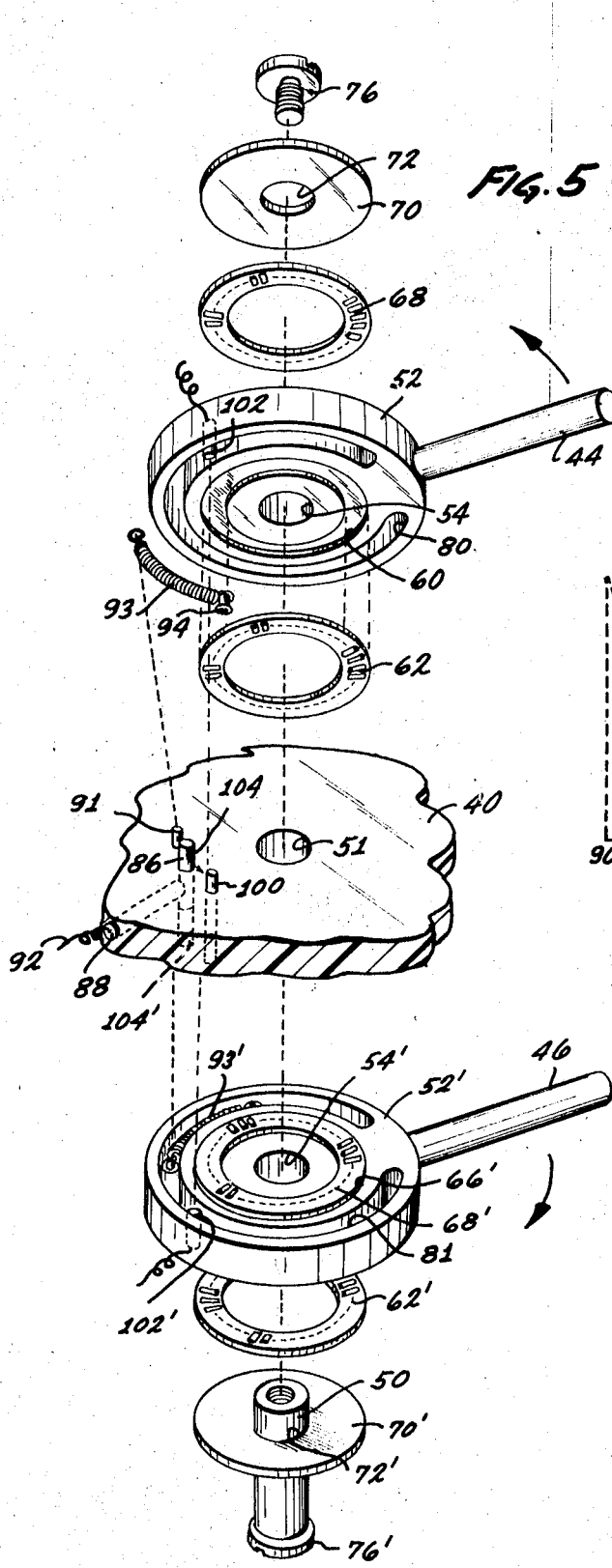
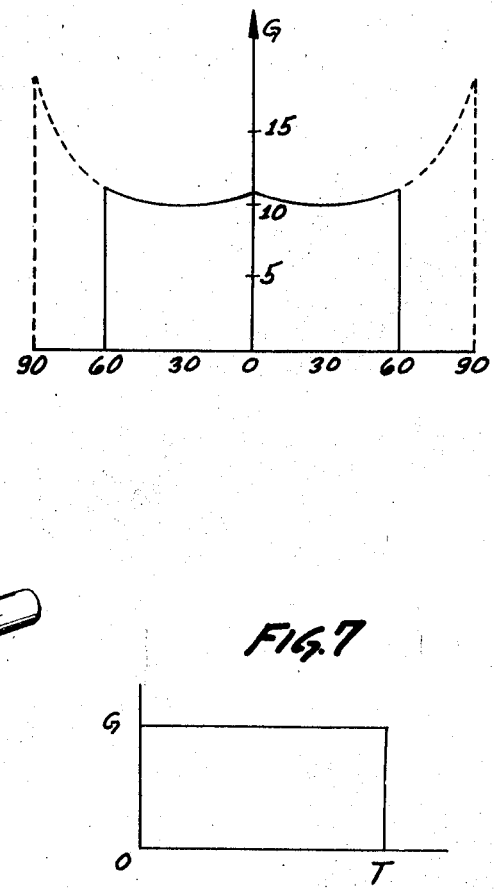
FIG. 5
FIG. 6
FIG. 7
INVENTOR
BERNARD MAZELSKY
BY Herzig & Walsh
ATTORNEYS

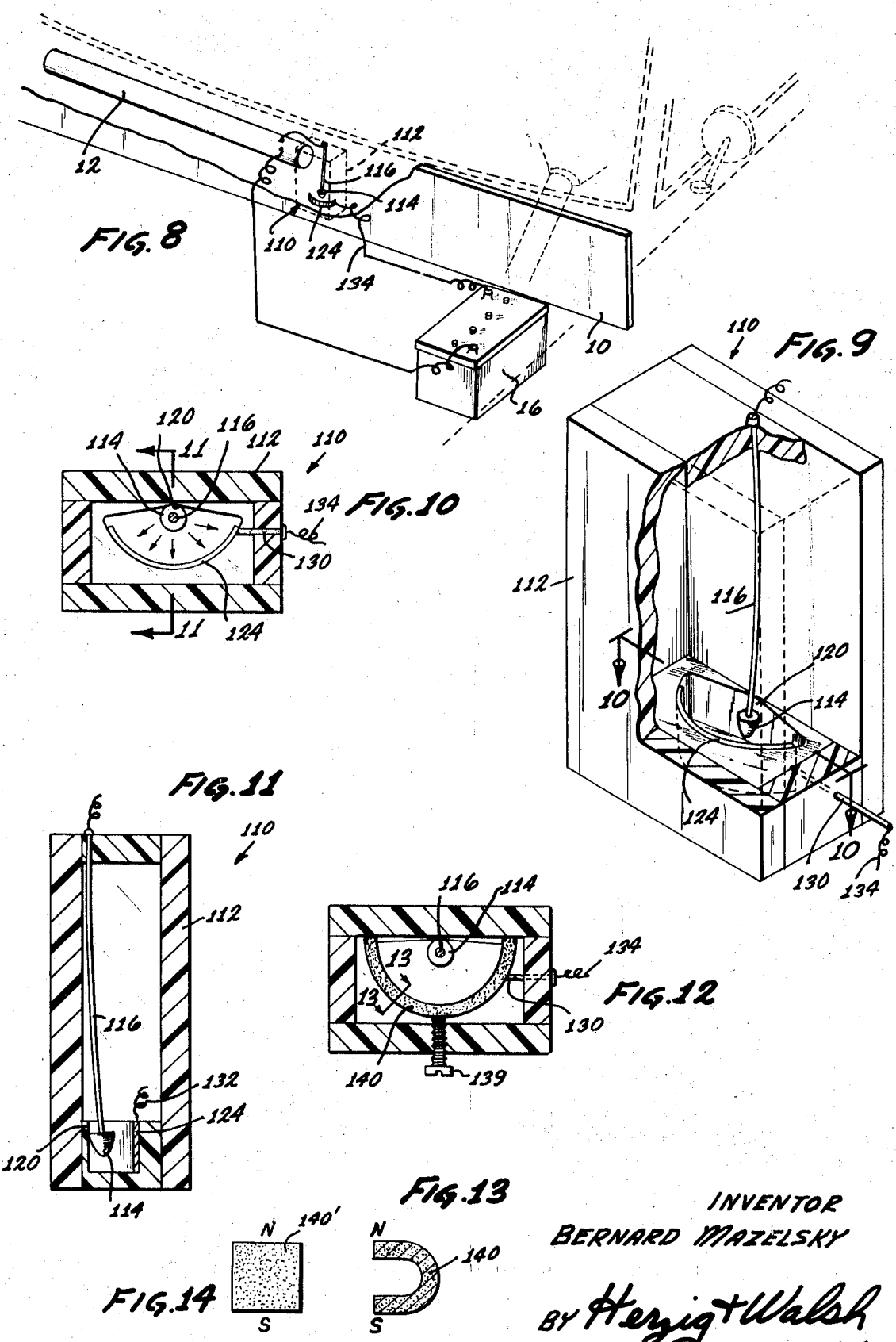

DECELERATION-RESPONSIVE SENSORS

SUMMARY OF THE INVENTION

The invention relates to force-responsive sensors adapted to respond to acceleration and/or deceleration forces, the invention being particularly adapted to and intended for use to sense deceleration forces attendant to the impact involved in collisions between vehicles, or vehicles with other objects. Enhancement of automobile safety is currently an extremely urgent and pressing problem, it of course being generally known that the rate of fatalities and serious injuries resulting from automobile accidents is extremely high. A very important type of safety device that has been devised and which is expected to be brought into common use is the safety air cushion of air bag system. This system provides an inflatable bag or bags with means to instantly inflate the bag in a position in front of the passenger to protect the passenger at the moment of collision. That is, means are provided to inflate the bag at the beginning of the impact and before its consummation so that the inflated bag is in position in front of the passenger before the full force of the impact has had an opportunity to cause the passenger to be thrown forward in a manner to inflict injury or death. A preferred system of this type is disclosed in the prior application of Bernard Mazelsky, Ser. No. 885,601, filed Dec. 16, 1969.

In systems of the type referred to, means are provided to inflate the air bag very quickly and of course triggering means are provided to initiate the inflation in response to the deceleration forces occurring at the moment of impact. The sensors described herein are intended to serve this purpose, that is, to respond to the occurrence of the deceleration forces and to trigger the safety means, that is the inflatable bag or comparable device.

A sensor adapted to this particular duty and service must embody certain characteristics to be effective and practicable. Among these characteristics are of course that the device must be reliable and dependable and it must be reasonably simple and economical. Furthermore, it must have the characteristic that it is not subject to responding inadvertently or at undesired times causing the safety device to be inflated. Furthermore, it is necessary that it have the characteristics that it will only activate in response to deceleration forces of a predetermined magnitude and that are sustained for a predetermined time. A device failing to have such characteristic would be objectionable in that it would be subject to responding and triggering the safety device at undesired and unwanted times.

The primary object of the invention is to provide sensing devices particularly adapted for the duty referred to in the foregoing and embodying all of the specific characteristics as outlined.

Preferred exemplary forms of the invention are described in detail hereinafter, each form embodying the specific characteristics referred to in the foregoing.

A further object is to provide a sensor of the type described constructed to be suitable for use in vehicles and adapted to respond to deceleration forces arising from collisions or impacts in various directions ranging from dead ahead to broadside.

A further object is to provide a sensor as described in the foregoing embodying one or more inertia masses responsive to deceleration forces, and biased to an initial position to prevent activation resulting from vibration or wobbling or the like.

Another object is to provide a sensor of the type referred to embodying a plurality of inertia masses positioned so as to provide activating responses to acceleration forces acting along any of a plurality of directions through a range of substantially 180°.

Another object is to provide a sensor as referred to in the foregoing wherein one or more inertia masses are provided mounted to rotate about an axis substantially normal to the direction of the deceleration forces.

Another object is to provide a sensor of the type referred to wherein an inertia mass is suspended by means exerting a biasing force urging the inertia mass into initial position.

Another object is to provide a sensor of the type referred to in the previous object including contacts actuatable by the sensor including a contoured contact, contoured so that the movement required to activate is the same irrespective of the direction of the decelerating force.

Another object is to realize the characteristics that the sensors will not respond to other than desired stimuli, this being achieved by maximizing the impulsive electrical energy required to fire the squib or detonator and providing magnetically held contacts which will allow for this increased energy to occur during a 1 to 2 millisecond duration.

In addition, the position of the magnet relative to the contacting moving mass could be used as a means of calibrating the exact acceleration force and duration required for activation.

Further objects and additional advantages of the invention will become apparent from the following detailed description and annexed drawings wherein:

FIG. 1 is a pictorial view showing installation of one form of the sensor in a vehicle;

FIG. 2 is a plan view of one form of construction of the sensor;

FIG. 3 is a sectional view taken along the line 3 — 3 of FIG. 2;

FIG. 4 is a broken away perspective view illustrating the contacting members that are actuated by the sensor;

FIG. 5 is an exploded view showing in detail the parts of the sensor shown in FIGS. 1, 2, 3 and 4;

FIG. 6 is a graph showing curves illustrating the relationship between G-forces and angular direction of impact for a two-mass system;

FIG. 7 is a graph illustrating the magnitude of G-force required to activate the device and the time during which this magnitude must be sustained to activate the device;

FIG. 8 is a view similar to FIG. 1 illustrating the installation of another form of the invention;

FIG. 9 is a broken away perspective view of the form of sensor shown in FIG. 8;

FIG. 10 is a plan view of the sensor of FIG. 9;

FIG. 11 is a sectional view taken along the line 11—11 of FIG. 10;

FIG. 12 is a sectional view of a modified form of the device of FIGS. 9, 10, and 11;

FIG. 13 is a sectional view taken along line 13—13 of FIG. 12; and

FIG. 14 is a view of another form of magnet.

DESCRIPTION OF THE PREFERRED EMBODIMENT

Referring to FIG. 1, it illustrates diagrammatically a typical installation in a vehicle having a firewall 10. Numeral 12 illustrates diagrammatically an inflatable bag safety device appropriately positioned to protect passengers in the vehicle. Numeral 14 designates generally one form of the sensing device of the invention which is installed in back of the firewall at an intermediate or midposition thereof. Numeral 16 designates the storage battery with which the vehicle is equipped and the electrical connections to the sensor 14 and the safety device 12. As will be explained presently, there are two pairs of electrical contacts in the device 14, either pair of which upon closure can trigger the safety device 12.

FIGS. 2, 3, 4, and 5 illustrate the device in greater detail. In the exemplary form of the invention shown, the sensor is housed in a relatively small generally square housing shown in FIG. 2. The housing has a front wall 20 which can be mounted against the firewall 10 as shown or can be attached directly at the side of the safety device 12 to form a complete module safety package. It has sidewalls 22, 22′, and 24 and a rear wall. The bottom is closed by a bottom cover plate 26 attached by screws as shown at 28. The top is closed by a top cover plate 32 attached by screws as shown at 34.

Within the housing there is an intermediate horizontal partition or septum 40. Two inertia masses are provided which are rotatable about a vertical axis which is normal to the direction of the actuating deceleration forces to be expected. These inertia masses are designated at 44 and 46 in FIG. 5, the masses being rotatable about a vertical axis provided by a center post or pivot 50. The post 50 is positioned to one side of the housing as may be seen in FIG. 2 and extends through an aperture 51 in the partition member 40. The inertia masses 44 and 46 in the exemplary form of the invention have normal or initial positions spaced angularly 60° from each other as illustrated in FIG. 2. The inertia member 46 is positioned 60° from the direction of travel of the vehicle as illustrated in FIG. 2. In the exemplary form of the invention the inertia masses 44 and 46 are in the form of rods made of a metal of suitable density, each being attached to a member which is rotatable. The inertia member 44 extends radially from a rotary disc member 52 having a central aperture 54 which is journaled on the post 50. The inertia mass 46 extends radially from a similar rotatable disc member 52', having a central aperture 54' which is journaled on the post 50. The members 52 and 52' are alike in construction as will be described. The member 52 has a circular, that is, an annular recess or groove 60 in its lower face adapted to receive or have fitted therein roller bearing 62. The roller bearing 62 is of conventional construction comprising a ring shaped race holding radially positioned roller bearing members. The bearing 62 rests on the top surface of the partition member 40.

The member 52' has a similar annular groove or recess 65 in its lower face and into which fits a similar roller bearing 62'. The member 52 has a similar circular or angular groove or recess in its upper face as designated at 66 adapted to receive therein a similar roller bearing as designated at 68. The member 52' has a similar angular groove or recess 66' in its upper face which receives another similar roller bearing member 68'. FIG. 3 illustrates the manner in which the parts as so far described are assembled. Numeral 70 designates a retainer disc with center aperture 72 and numeral 70' designates a similar retainer disc with central aperture 72'. When the parts are assembled, the disc 70 engages the bearing 68 and retains it whereas the disc 70' engages the bearing 62' and retains it, the parts being held in assembled relationship by a screw 76 which threads into the upper end of post 50 and a similar screw 76' which threads into the opposite end of the post 50.

The member 52 has another angular groove in its lower face as designated at 80 having a greater radius than the groove 60 and having ends terminating adjacent to the inertia member 44. The member 52' has a similar angular groove or recess 81 in its upper face.

The purpose of these grooves will be explained presently.

Extending through the partition member 40 parallel to the post 50 is a contact pin 86 which has end parts extending outwardly from the upper and lower surfaces of the member 40. Numeral 88 designates a threaded member threaded into a horizontal bore at one side of the partition 40 as may be seen in FIG. 3, and extending to the exterior of housing 14. There is a nut 90 on this stem outside of the housing 14 and an electrical connection can be made to this stem as indicated at 92. Numeral 90 designates a pin extending through the partition 40 and having end parts extending from the upper and lower surfaces thereof. Numeral 93 designates a coiled biasing spring, one end of which is attached to an extending end of the pin 91 and the other end of which is attached to a pin 94 as may be seen in FIG. 5, which is in an axial position in the angular groove 80. The spring 93 is a biasing spring normally urging the inertia mass 44 and member 52 angularly into an initial position. Numeral 100 designates an additional stop member having end parts extending from the upper and lower surfaces of the partition member 40 as shown in FIG. 5. Numeral 102 designates an axially positioned electrical contact member positioned in the annular groove 80 at a position as shown in FIG. 5. The initial or start position of the member 52 is determined by contact member 102 coming into engagement with the end of the pin 100 as may be seen in FIG. 4. As may be observed from FIGS. 2 and 4, the disc 52 is rotated in a clockwise direction and as observed in these figures, the contact 102 will be brought into engagement with a flat 104 on the extending end part of the contact 86 to thereby complete a circuit for energizing the safety device 12. It will be understood of course and as will be described in more detail presently, in the event of an impact the direction of the decelerating force acting on the inertia mass 46 will be in a direction to cause the inertia mass to rotate clockwise looking at FIG. 2.

Having reference to the rotatable member 52' it is provided with a similar biasing spring 93' and contact member 102'. The spring 93' is attached at one end to an extending end part of the pin 91. The contact 102' is engageable with the extending end part of the pin 100 to determine the initial or starting position of the rotatable disc 52'.

From the foregoing, it will be observed and understood from the construction so far described that the rotatable discs 52 and 52' are mounted so as to be rotatable substantially without friction so that their angular movement is due solely to the effect of acceleration forces acting on the inertia masses 44 and 46. The operation of the device will be readily understood by those skilled in the art. The discs 52 and 52' are free to rotate separately from each other each being biased into an initial position as described to prevent inadvertent actuation resulting from vibration or wobbling. Acceleration forces of sufficient magnitude and duration acting on either of the inertia masses 44 or 46 will cause it to rotate sufficiently to bring the contacts into engagement, that is, contact 102 and 104 or 102' and 104', thereby to energize the safety device 12.

The angular positioning of the inertia masses 44 and 46 is selected to accommodate the device to respond appropriately to impacts producing deceleration forces in different directions, that is, forces resulting from dead ahead collisions or collisions or impacts at angles other than dead ahead ranging to broadside impacts. FIG. 6 is a graph illustrating the G-force characteristics of the device relative to the angle of impact, that is, relative to the angular direction of the actuating deceleration force. In FIG. 6, the abscissa are angles of deviation of the impact from dead ahead and the ordinates are G-forces. It will be observed that there is only limited variation in the amount of the developed G-forces from the dead ahead to the 60° position on either side, this being reflected by the two curves, one for the inertia mass 44 and the other for the inertia mass 46. Beyond the 60° position, the acceleration forces required to activate the switch increase rapidly.

In addition to the foregoing, it will be understood that the inertia masses 44 and 46 and their disc rotors 52 and 52' which are freely rotatable substantially without friction are constructed to have each a particular natural frequency of vibration. The reason for this is to insure that the switch contacts will be actuated to trigger the safety device only the event of an impact producing G forces of predetermined magnitude and duration, that is, that the magnitude is sustained for a predetermined minimum period of time. FIG. 7 is a graph illustrating this characteristic. The abscissa is the time period which may be in milliseconds and the ordinate is the magnitude of the G-force. The G-force is shown as a constant represented by a horizontal line and persisting or being sustained for T-seconds; failure of this magnitude or this period of sustainment will not activate the switch contacts.

A natural frequency is built into the device to be such that the period of the device would not permit it to actuate in the absence of the predetermined magnitude of force and period of sustainment. The natural frequency is of course readily susceptible to mathematical calculation, this process being one which is capable of being undertaken by one skilled in the art, the natural frequency established being related to the acceleration forces encountered and the amount of angular movement built into the device to bring about closure of the contacts such that the purpose and result as described is achieved. That is, as stated, the device will not respond undesirably to acceleration forces not of the required magnitude and duration, but only to those reflecting impacts requiring activation of the inflatable bag safety device.

FIG. 8, 9, 10 and 11 of the drawings show another form or embodiment of the invention which has the same basic characteristics as described in the foregoing in connection with the previous embodiment. The sensor is designated at 110 in FIG. 8, the system otherwise being similar to that of FIG. 1. The sensor is shown in greater detail in FIG. 9, 10 and 11. The sensor is enclosed in a rectangular housing 112. It comprises an inertia mass 114 which is suspended in the manner of a pendulum by a suspending stem 116. The stem 116 is made of a resilient material which may be a suitable metal that also serves as an electrical connector to which a lead is connected. The stem 116 extends downwardly from the top of the housing 112 and the inertia mass 114 is at its end. The mass 114 is normally biased against a stop 120 at the back of the housing 112. The inertia mass 114 forms a contact itself and spaced from it is a curved contact 124 that subtends an arc of substantially 154°. The contact 124 is connected to a terminal stem 130 by a lead wire 132, the stem extending to the exterior of the housing 112 and having an electrical lead 134 connected to it.

In the event of an impact between the vehicle and another vehicle or an object deceleration forces will be set up which will cause the inertia mass 114 to be displaced from its position as shown in FIG. 11, causing it to move in a direction to engage the contact 124 to complete a circuit for triggering the safety device 12. Contact 124 has a particular contour. The tension in the resilient stem 116 normally biases the inertia mass 114 against the part 120, this characteristic being similar to that of the previous embodiment to prevent activation resulting from vibration or the like. This offset or preloading has the effect as described.

It has been found that when there is an impact-producing deceleration force, the pendulum does not traverse a trajectory along the angular line or direction of the impact but rather along a path or trajectory having a greater angle, that is, a divergent angle, this resulting from the fact of the initial offset or preloading. Thus, for a 60° impact, that is, in a direction displaced 60° from head on, the inertia mass will follow a trajectory which is 13° from the 90° position. For a 60° impact and a nominal offset or preloading, it has been found that the inertia mass will follow a trajectory of 77.2°. Thus, to accommodate impacts to 60° on both sides requires a contact member extending more than 120° but rather 77.2° on each side of dead ahead or a total of 154.4°. The greater amount of offset, that is, preloading, the greater will be the deviation of the actual trajectory of the inertia mass from the angle of impact line.

The contact member 124 is contoured to realize the desired effect. It is not exactly an arc of a circle but is very similar to an arc of a circle. Its curvature is accurately calculated. It is calculated to have a contour so that for any angle of impact, the actual trajectory of the inertia mass 114 at that angle, the spacing between the contact 124 and the initial position of the inertia mass 114 is the same. Thus, the device is stable and uniformly responsive to impacts at any angle displaced from dead ahead; or in other words, at any angle the magnitude of deceleration forces and their period of sustainment to activate the device remains the same.

The device has the same characteristic as the previous embodiment in that the natural frequency of the inertia mass 114 and its suspension is calculated and constructed such that in relation to the acceleration forces to be encountered it will not respond to close the circuit except if there exists an acceleration force of predetermined magnitude that is sustained for a predetermined time interval as illustrated in FIG. 7. As in the previous embodiment, the acceleration forces to be expected at different angles are readily subject to calculation, as is the natural frequency of a particular inertia mass system so that the result illustrated in FIG. 7 can be realized.

The device of FIGS. 8, 9, 10 and 11 has a difference in characteristic from that of the previous embodiment in that the inertia mass 114 can move in any angular direction within the angular range of the contact 124 and the effective displacement force on it is the same, that is, this force does not vary as a function of the angular direction of movement of the inertia mass 114. That is, considering FIG. 6, the graph for this device would show straight lines rather than curves for the relationship between G-force and displacement angle.

The operation of the embodiment of FIGS. 8, 9, 10, and 11 is that set forth in the foregoing and will be readily understood by those skilled in the art. The device accommodates itself to respond to impacts giving rise to deceleration forces in any direction from dead ahead to displacement of 60° or more either way. It has the characteristics as described similar to that of the previous embodiment and the additional characteristic as described relative to the diagram of FIG. 6.

FIGS. 12 and 13 show a form of the device in which the contoured contact is in the form of a magnet 140 having a cross section as shown in FIG. 13. The magnetic field is such as to provide a uniform attracting and holding force between the contacts irrespective of the direction of movement of mass 114. The most effective magnet is the horseshoe shape shown in FIG. 13. An alternate shape is shown in FIG. 14 wherein the magnet's cross section is rectangular with poles as shown. This form would have a lower magnetic attraction force than the horseshoe but would be less expensive to manufacture. In FIG. 12, the position of the magnet can be made adjustable in the fore and aft directions by a setscrew 139 which would provide calibration capability to accommodate variations in spring characteristics of element 116 and mass characteristics of mass 114.

The magnetic holding force is extremely important. The device 12 may be triggered by a sensitive squib or detonator. By providing for magnetically held contacts, the impulsive electrical energy required to fire the squib or detonator can be maximized so that extraneous electrical energy cannot cause accidental or inadvertent firing.

From the foregoing, those skilled in the art will fully understand and appreciate the manner in which the various forms of the invention achieve the objectives set forth in the foregoing and accommodate the desired results and purposes. The devices described have the necessary characteristics and attributes to make them successful and practical for the purposes intended.

The foregoing disclosure is representative of preferred forms of the invention and is to be interpreted in an illustrative rather than a limiting sense, the invention to be accorded the full scope of the claims appended hereto.

What is claimed is:

1. A sensor particularly adapted for sensing deceleration forces acting in any of a plurality of directions comprising in combination, inertia mass means, means mounting said inertia mass means to undergo predetermined movement in response to deceleration forces acting on the mass means in any of a plurality of divergent directions said mass means having a normal position and means biasing the mass means into said normal position, means whereby said mass means is orientable and movable without rubbing with said mounting means and said biasing means so that deceleration forces acting in any of the plurality of divergent directions will cause the mass means to move away from said normal position substantially without friction and means responsive to a predetermined movement of the mass means said last means including an electrical contact positioned to stop movement of the mass means and to complete a circuit at the stopped position.

2. A device as in claim 1, comprising a plurality of masses relatively disposed with respect to each other, whereby said masses are responsive to acceleration forces acting along any one of a group of different directions.

3. A device as in claim 1, wherein the moveable inertia mass means is constructed to have a natural frequency such as to require a deceleration force having a predetermined magnitude and one that must be sustained for a predetermined time to actuate said responsive means.

4. A device as in claim 1, wherein said responsive means comprises switch contacts.

5. A device as in claim 1, wherein the inertia mass means is mounted to be rotatable about an axis substantially normal to the directions of actuating deceleration forces.

6. A device as in claim 2, comprising at least two inertia masses spaced from each other and mounted to respond to actuating deceleration forces, acting in different directions.

7. A device as in claim 1, wherein said inertia mass means is suspended in the manner of a pendulum.

8. A device as in claim 7, wherein the inertia mass means is suspended by a resilient member normally biasing the inertia mass means into an initial position.

9. A device as in claim 7, wherein the responsive means comprises electrical contacts including a contact carried by the inertia mass means and a contoured contact engageable by the first mentioned contact.

10. A device as in claim 9, wherein the contoured contact is contoured such that for any direction of the decelerating force over a wide range of directions, the contact carried by the inertia mass means is moved the same amount to engage the contoured contact.

11. A device as in claim 9, including magnetic means having a field to cause holding attraction between the contacts at any position.

12. A device as in claim 11, including a magnet conforming to said contoured contact.

13. A device as in claim 12, wherein said magnet is of horseshoe shape in cross section.

14. A device as in claim 12, wherein said magnet is of rectangular or square shape in cross section.

* * * * *